United States Patent [19]
Rieman

[11] 3,795,790
[45] Mar. 5, 1974

[54] CONTROL CIRCUIT
[75] Inventor: Willis E. Rieman, Skaneateles, N.Y.
[73] Assignee: Gulf & Western Systems Company, New York, N.Y.
[22] Filed: Aug. 22, 1972
[21] Appl. No.: 282,828

Related U.S. Application Data
[63] Continuation-in-part of Ser. No. 212,016, Dec. 27, 1971.

[52] U.S. Cl. ............................. 219/490, 219/511
[51] Int. Cl. .................................... H05b 1/02
[58] Field of Search ... 219/490, 494, 497, 499, 501, 219/505, 511

[56] References Cited
UNITED STATES PATENTS
3,548,157  12/1970  Lauck .............................. 219/501
3,588,447  6/1971  Mills ................................ 219/501

Primary Examiner—Bernard A. Gilheany
Assistant Examiner—F. E. Bell
Attorney, Agent, or Firm—Meyer, Tilberry & Body

[57] ABSTRACT

A temperature sensitive responsive loop and a heater element control loop are functionally connected by a gate control loop combining to form a three loop temperature control circuit. The temperature sensitive responsive loop is magnetically coupled to the gate control which is coupled across a gate controlled switching element in the heater control loop.

10 Claims, 4 Drawing Figures

CONTROL CIRCUIT

BACKGROUND OF THE INVENTION

This application is a continuation-in-part of U.S. Patent application Ser. No. 212,016 filed Dec. 27, 1971.

The present invention relates to temperature sensitive heater element control circuits. More particularly the present invention is a triple level, temperature sensitive, adjustable, heater element control circuit employing magnetic coupling between the first and second levels, and gating control coupling between the second and third levels for controlling, on a positive "on" or "off" basis, the heater element of an oven or furnace.

The present temperature sensitive heater element control circuit has advantages over other circuits performing somewhat similar functions in that the present circuit is much less complex than normally used, is very stable and requires no adjustment after initial adjustment of the circuit components has been made. In addition to these advantages the components of the circuit which are not temperature responsive, are substantially temperature stable so that the circuit is insensitive to ambient temperature changes and in addition, is very inexpensive to build. The present control circuit has been found to work very well with trouble-free, long life expectancy, without gradual degeneration of the components of the circuit.

In its disclosed form the present invention includes a three loop or three level circuit arrangement in which the first loop or level is a temperature sensitive and responsive loop. This loop includes a heat or temperature sensor or responsive means, for example a thermistor, which is located in the temperature controlled environment. This may be an oven (as represented in the drawings) or some other environment such as a room or structure of any place or thing or mass in which it is desired to control the environmental temperature, or the temperature of the mass. Another component in the first loop is a temperature control, which in the present circuit is an adjustable resistor or potentiometer, which may be calibrated in degrees of heat. Another component of the first loop is a magnetic force generator, such as a coil. The first loop is driven by a direct current (DC) which is applied to the loop at all times during the time the circuit is turned on. The resistance-inductance values of this circuit are such that when the circuit is in a balanced condition the active resistance value of the circuit is such that the current flowing through the coil drives the coil to generate a magnetic force of predetermined intensity. The magnetic force is the coupling between the first and second loops of the circuit.

The third loop is the heater element control loop which is a controlled loop, from a functional sense. The controlled loop includes a gated switching element, the heater element or heater element control coupled in series with an alternating current (AC) sufficient to drive the heater element or the heater element control. The gated switch may, for example be a pair of back-to-back silicone controlled rectifiers (SCR'S) or a triac, with positive on/off control over the electric power driving the heater element.

The second loop may be referred to as a gate control loop. This circuit includes a pair of contacts, for example a reed relay, and a resistance connected in series with the reed relay across the gated switch, therefore serving as a gate control for the gated switch. The pair of contacts are magnetic sensitive, the second loop being magnetically coupled to the first loop functionally the pair of magnetic sensitive contacts are positioned in the magnetic field generated by the coil. The second loop is coupled to the third loop via its connection across the gated switch of the third loop.

The magnetic sensitive contacts of the second loop are physically controlled by the intensity or magnitude of the magnetic force generated by the coil while the gated switch is controlled by the physical position (opened or closed) of the pair of magnetic sensitive contacts to the extent that when the contacts are closed the gating circuit of the gated switch is closed thereby turning the switch "on" thus electrically completing the driving circuit for the heater element in the third loop. The intensity or magnitude of the magnetic force generated by the coil is a function of the DC input, the amount of turns in the coil and the active resistance in the first loop of the circuit. The magnetic force may be changed by holding the DC input stable and maintaining the number of turns in the coil the same and changing the active resistance in the first loop. The resistance in the first loop of the circuit may thus be changed by a change in the environment temperature thereby causing a change in the active resistance of the heat sensor or thermistor or temperature responsive resistor or, by manual adjustment of the adjustable resistance or potentiometer.

Therefore, it is an object of the present invention to provide an improved temperature sensitive heater element control circuit.

Another object is to provide an improved temperature sensitive heat control circuit having components, other than the heat sensing component, which are insensitive to ambient temperature change.

A further object is to provide an improved temperature sensitive, triple level heating element control circuit having trouble-free, long life expectancy.

These and other objects will become apparent when reading the following detailed specification in conjunction with the accompanying drawings in which.

Figure 1:
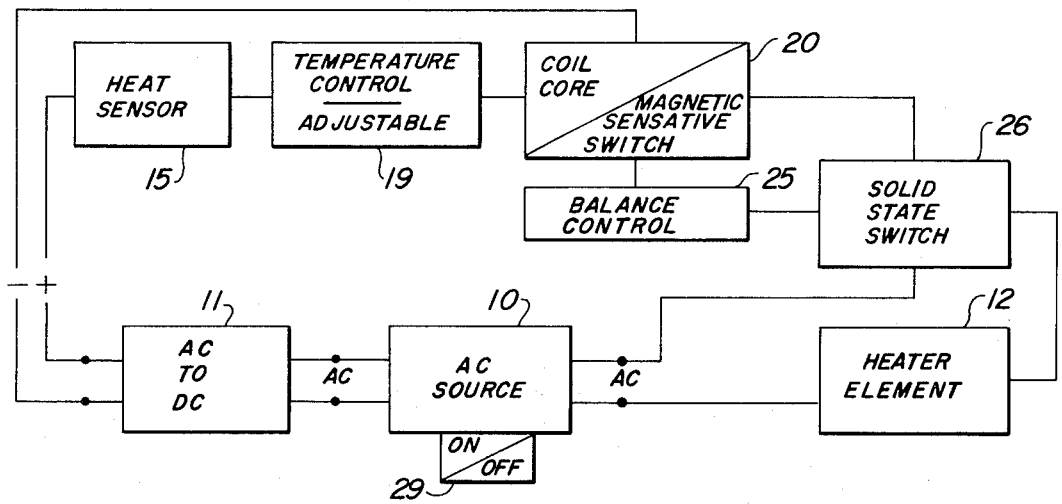
FIG. 1 is a block diagram of the present invention.

Referring particularly to FIG. 1, it will be seen that an alternating current (AC) source 10 is provided for circuit operation. Some of the output of the AC source is rectified, in a conventional AC to DC rectifier, into a direct current (DC) 11. Other of the output of the AC source is used to drive the heater circuit. The presented embodiment employs electric energy to drive an electric heating element. In this arrangement the heater element 12 is energized by the AC source 10 under the control of a slide state switch (sss) 26. This AC source could be the usual 110 volt AC source or a 220 volt AC. The electric energy could be single phase or multiphase energy. The type of electric energy used would depend upon the characteristics of the circuit components in the AC loop. In addition, the type of rectifier 11 would also depend upon the type of AC used.

Figure 2:
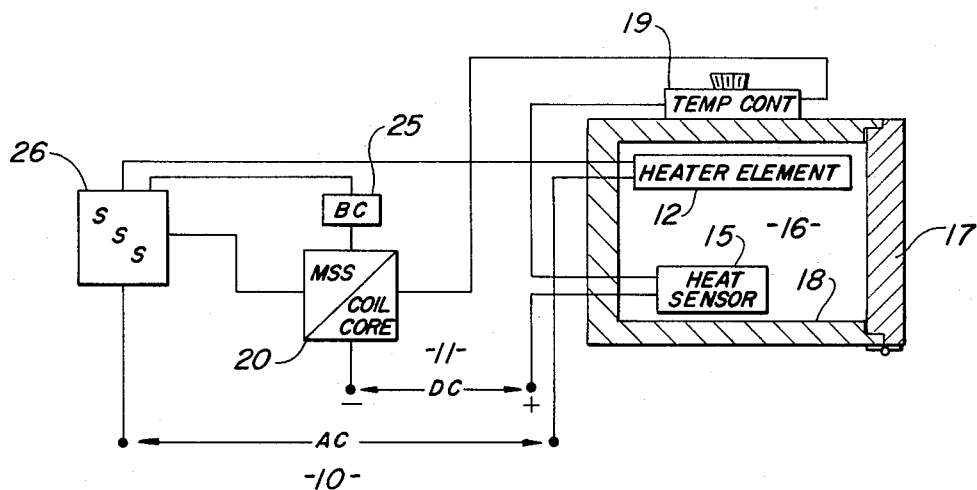
FIG. 2 is a functional diagram helpful in understanding the invention.
Figure 3:
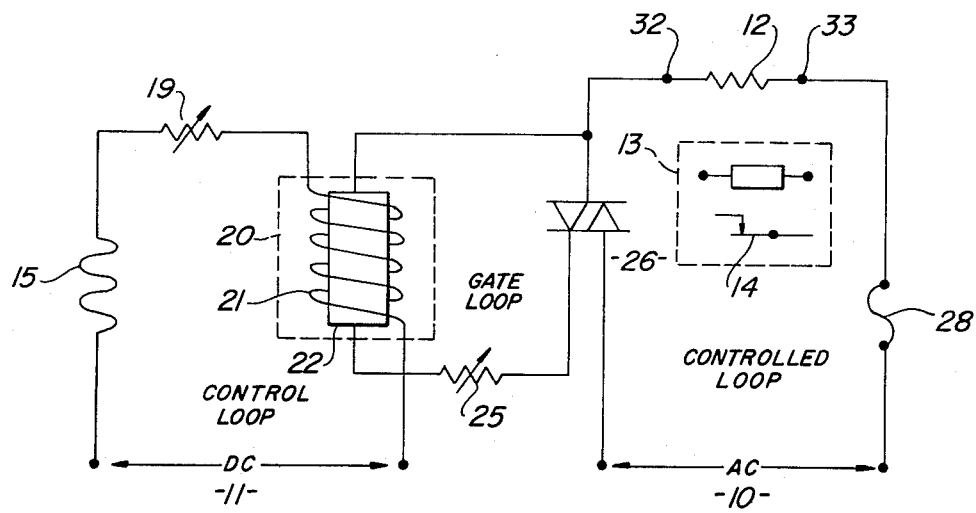
FIG. 3 is a simplified circuit diagram of the preferred form of the present invention; and, FIG. 4 is a simplified circuit diagram showing another embodiment of the present invention.

The heat sensor, block 15 of FIGS. 1 and 2, is represented as a thermistor 15 in the circuit diagram of FIG. 3. The thermistor 15 is connected to one terminal of the DC 11, for example the positive output or terminal. FIG. 2 represents that the thermistor 15 is positioned in the controlled environment, here represented as an enclosed and insulated chamber 16, such as an oven, for example formed by a door 17 and the enclosing sides, top, bottom and end, 18. In the present arrangement, a thermistor having a positive coefficient is employed, i.e. a thermistor which increases in resistance as the temperature of the environment in which it is positioned, increases.

It should be noted that the same components are given identical identification throughout the drawings.

The temperature control-adjustable, block 19, may be a potentiometer (FIG. 3) and may be remotely positioned or may be adjacently positioned, as for example, on the exterior of the environmental chamber (FIG. 2). The potentiometer 19 may be calibrated in degrees of heat, such as in Fahrenheit or Centrigrade or intensity of heat, such as warm, medium, hot, very hot. Block 20 may be referred to as a duplex block since this block represents a coil 21 around an air core 22 in which is positioned a magnetic sensitive switch (mss). The other end of the coil is connected to the return or negative supply or terminal of the DC. This is one loop or circuit level and may be referred to as the CONTROL LOOP of the triple level control circuit.

Functionally, the rectified DC is maintained at a substantially stable level using conventional AC to DC rectification technology. As the thermistor 15 changes resistance due to a change in the environmental temperature in the oven, the current through the coil 21 changes thereby changing the intensity of the magnetic field generated about the coil. Any change in the electrical parameters of the components of the CONTROL LOOP will cause a change in the intensity of the magnetic field generated by the coil, thus effecting the magnetomotive force present around the coil. Assuming the DC values remain constant and the number of turns on the coil 21 remains constant, then, the value of active resistance in the temperature control 19 may be changed, by adjustment whether manual or automated for example, or the value of active resistance of the thermistor 15 may be changed by a change in the environmental temperature. A change in the active resistance in the first loop of the circuit will cause a change in the amount of current flow through the coil 21. A change in the current flow through coil 21 will change the amount of intensity of the magnetic force or flux generated by the coil 21.

Within the core 22 or positioned within the magnetic field generated by the coil 21 is a set of magnetic sensitive contacts, such as a magnetic responsive reed relay having at least two mating contacts which respond at a predetermined magnetic threshold, i.e. change condition (from normally opened to closed, from normally closed to opened, and from opened to normally closed or from closed to normally opened), when a sufficient magnetomotive force is present and/or is changed to intensity.

The magnetic responsive reed relay (not shown) may have threshold characteristics with respect to the intensity of the magnetic force generated by the coil 21. In this respect the sensitivity of the reed relay may be such that below a predetermined condition, for example open and at such threshold value of magnetic intensity, and above such threshold value, the reed relay contacts reverse their condition, for example close. A resistance 25 in series with reed relay adds balance and stability to the reed relay contact circuit, reducing contact migration between the two contact points and reducing arcing during movement of the contacts. The reed relay contacts are electrically isolated from the CONTROL LOOP, these contacts and resistor 25 forming part of what may be referred as a GATE LOOP since these components are connected across a gated switching component such as a pair of back-to-back silicone controlled rectifiers (SCR'S), 26 or a triac so as to provide a gate control circuit for the solid state switch 26. The SCR'S or the triac function as a solid state switch which is in the CONROLLED LOOP of the triple level control circuit. When the contacts of the relay 22 are closed, the solid state switch 26, is closed (or the "gate" is opened) to let current through to drive the heater element 12. A fuse 28 is represented in the circuit, of the CONTROLLED LOOP and an "on/off" switch 29 may be used to turn the entire circuit "on" or "off," as desired.

If the heat energy were other than electricity, as for example oil heat or gas heat, the heating element could be controlled by a contact 14, controlled by a relay 13 which relay would be coupled in the controlled loop instead of the heater element. The heater element 12 would be removed from the circuit at terminals 32 and 33 and the relay 13 would be connected to the terminals 32 and 33. The relay 13 and the contact 14 could be remote from the oil or gas heater unit and could be used in the oil heater circuit or gas heater circuit thereby providing positive on/off control of the oil heater unit or the gas heater unit. An alternative arrangement would be to connect the on/off electric control circuit of the oil or gas heater to the terminal 32 and 33 directly and thereby control the current supply as shown.

In the circuit arrangement of FIG. 3, it will be recognized that variable resistance means 15 is positionable in heat exchange relationship with a mass to be heated. This mass may be defined by the gaseous atmosphere within an oven or heating furnace, or by solid bodies being heated within the oven or furnace. The defined control loop of FIG. 3 having variable resistance means 15 therein may also be defined as a first loop. This first loop has electro-magnetic coil 21 connected in series with variable resistance means 15. Electromagnetic coil 21 may be defined as a first switch operating means. The gate loop of FIG. 3 may be defined as a second loop. The magnetic sensitive switch in this second loop defines a first switch means which is positioned for operation by the first switch operating means defined by coil 21. This defined first switch means is selectively movable between open and closed conditions by the first switch operating means. The controlled loop of FIG. 3 having heater element 12 therein may be defined as a third loop. Solid state switching device 26 connected in series with heater element 12 in this third loop may be defined as a second switch means. The second switch means defined by solid state switching device 26 includes a gate which is connected in series with the first switch means in the second loop. This gate means may be considered a second switch operating means in the second loop for triggering the second switch means defined by solid state switching device 26.

Figure 4:
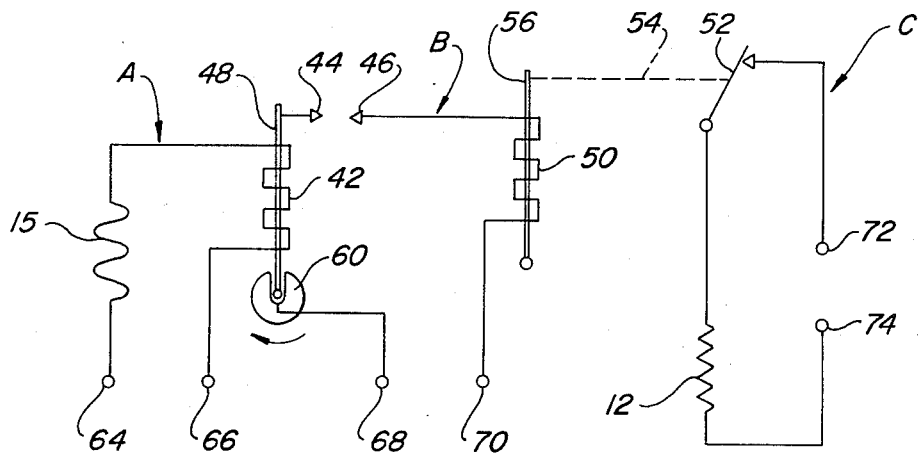

In accordance with another arrangement, coil 21 and solid state switching device 26 of FIG. 3 are replaced with bimetallic elements as shown in FIG. 4. In this arrangement, first, second and third electrical loops A, B and C are provided. First loop A includes variable resistance means 15 having automatically variable resistance characteristics with varying temperature for passing electrical current therethrough at a value proportional to its temperature. Variable resistance means 15 may be a thermistor having a negative temperature coefficient. However, in the preferred arrangement, variable resistance means 15 is of the type having a positive temperature coefficient. That is, an increase in temperature produces an increase in resistance so that current flow decreases with increasing temperature. Such resistors are formed of metallic alloys, such as nickel alloys, and are very stable.

First loop A includes an electrical resistance heating element 42 connected in series with variable resistance means 15. Electrical resistance heating element 42 may be defined as a first switch operating means.

Second loop B includes a first switch means which is operated between open and closed conditions by first switch operating means 42. This first switch means includes a pair of normally opened contacts 44 and 46 of an inexpensive switch. Contact 44 is connected for movement with a bimetallic element 48. Bimetallic element 48 forms a part of the first switch means and is positioned in heat transfer relationship with first switch operating means 42. Second loop B further includes second switch operating means 50 defined by an electrical resistance heater connected in series with the first switch means defined by contacts 44 and 46, and bimetallic element 48.

Third loop C includes a snap-acting switch 52 connected in series with heating means 12. Snap-acting switch 52 is normally open and is mechanically linked as at 54 with bimetallic element 56. Snap-acting switch 52 and bimetallic element 56 may be defined as second switch means which is selectively movable between open and closed conditions in response to second switch operating means 50. Bimetallic element 56 is positioned in heat transfer relationship with second operating means 50.

Third loop C is supplied from a high voltage power source, while first and second loops A and B are supplied with low voltage direct current. With such an arrangement, the switch containing contacts 44 and 46 may be very inexpensive because arcing is no problem with the low voltage power source. Switch 52 is preferably of the snap-acting type to prevent arcing and burning of the contacts due to the high voltage power supply.

In accordance with one arrangement, a control means in the form of a rotatable knob 60 is provided for adjusting the operating temperature which is being controlled. In the arrangement shown, knob 60 may be graduated in degrees Centigrade or Fahrenheit and connected with bimetallic element 48 for adjusting its position to vary the deflection which must take place before contacts 44 and 46 are closed. In the arrangement shown and described, knob 60 is rotated to the desired temperature setting and the main power source is turned on. Current then flows through first loop A to heat the first switch operating means defined by electrical resistance heating element 42. The mass whose temperature is being sensed by variable resistance means 15 is very low so that a high current flow will occur to rapidly heat element 42. Bimetallic element 48 will then deflect in response to heat from heating element 42 and close contacts 44 and 46. Current will then flow through second loop B to heat the second switch operating means defined by electrical resistance heating element 50. Bimetallic element 56 will then deflect in response to heat from heating element 50 and close switch 52 through linkage 54. When switch 52 closes, full power will be supplied to main heating element 12. As the temperature of the mass being heated by main heating element 12 increases, the resistance of variable resistance means 15 increases so that the amount of current passing therethrough decreases. As the temperature of the heated mass approaches its desirable value, the current flowing through variable resistance means 15 becomes so low that heating element 42 transfers insufficient heat to bimetallic element 48 for maintaining it in its deflected position closing contacts 44 and 46. Thus, when the mass reaches its desired temperature, switch contacts 44 and 46 open to deenergize heating element 50. Bimetallic element 56 then cools to open main snap-acting switch 52 and deenergizes main heating element 12. As the temperature of the mass begins falling below its desired value, the resistance of variable resistance means 15 decreases so that sufficient current again flows therethrough for heating element 42 so that it can transfer sufficient heat to bimetallic element 48 to deflect for closing contacts 44 and 46. Heating element 50 then heats bimetallic element 56 so that it deflects to close snap-acting switch 52. The circuit will then cyclically operate for maintaining the temperature of the mass at its desired value. The first switch operating means defined by heating element 42 is responsive to variations in electrical current flowing through variable resistance means 15 for cyclically operating the first switch means defined by bimetallic element 48 and contacts 44 and 46. The second switch operating means defined by heating element 50 is responsive to cyclical operation of contacts 44 and 46 for cyclically operating the second switch means defined by switch 52 and bimetallic element 56 for controlling operation of main heating means 12. It will be recognized that the same cyclical operation occurs in the circuit of FIG. 3. The first switch operating means defined by coil 21 is responsive to variations in electrical current flowing through variable resistance means 15 for cyclically operating the first switch means defined by the magnetic sensitive switch positioned in the second or gate loop. The gate for solid state switching device 26, which defines a second switch operating means, is responsive to cyclical operation of the first switch means defined by the magnetic sensitive switch for cyclically operating the second switch means defined by solid state switching device 26 for controlling operation of main heating means 12.

For some applications, it may be possible to eliminate second loop B, along with heating element 50, bimetallic element 56 and contacts 44 and 46. Bimetallic element 48 would then be linked directly with switch 52. At very low temperature settings, bimetallic element 48 would have insufficient deflection to cyclically operate snap-acting switch 52. Operation of conventional snap-acting switches require more travel than will take place at low temperature setting for bimetallic element 48 in a small control arrangement of the type contemplated. In the preferred arrangement described, which includes second loop B, contact 44 may be soldered or brazed directly onto one side of bimetallic element 48 for direct cooperation with contact 46. No snap-action is required due to the low voltage power supply and the switch will operate at all temperature settings.

It will be recognized that the various switch operating means and switch means defined in the circuits of FIGS. 3 and 4 may be interchanged. For example, heating element 42 in the first loop of FIG. 4 may be replaced by coil 21 of FIG. 3. The first switch means defined by contacts 44 and 46 along with bimetallic element 48 would then be replaced by the magnetic sensitive switch of FIG. 3. The remainder of the circuit in FIG. 4 could be unchanged. Likewise, it will be recognized that it is possible to replace solid state switching device 26 of FIG. 3 with heating element 50, bimetallic element 56 and snap-acting switch 52. Various other combinations will also occur to others skilled in the art.

The main heating means has been shown as an electrical resistance heater 12. However, it will be recognized that heating element 12 may be replaced with an electrical servo valve through which combustible gas is fed to a gas burner for heating the mass. Such a valve, in combination with the burner to which it supplies fuel, would then define a part of the heating mean which is controlled by the improved control circuit described and claimed. Therefore, when a heating means is defined, it will be recognized that this includes either an electrical heating element or an electrical servo valve or the like which forms part of a gas-fueled heating means.

First loop A includes terminals 64 and 66 which may be connected with any suitable source of AC or DC voltage in a known manner. Second loop B includes terminals 68 and 70 which may also be connected with any suitable source of AC or DC voltage. Third loop C has terminals 72 and 74 which are preferably connected with an AC voltage source, although they may be connected with a DC voltage source when the third loop is used for controlling a valve through which combustible fuel is fed to a burner.

There has been described herein a triple level, temperature sensitive adjustable heating control circuit, with suggested modification for controlling various forms of heater elements or burners. Although the invention has been described with reference to certain preferred embodiments, it is obvious that equivalent alterations and modifications will occur to others skilled in the art upon the reading and understanding of this specification. The present application covers all such equivalent alterations and modifications and is limited only by the scope of the claim.

Having thus described my invention, I claim:

1. A temperature control circuit for controlling operation of heating means for heating a predetermined mass to a desired temperature comprising; a first electrical loop including automatically variable resistance means having automatically variable resistance characteristics with varying temperature for passing electrical current therethrough at a value proportional to its temperature, said variable resistance means being positioned in heat exchange relationship with said mass, first switch operating means in series with said variable resistance means in said first loop, a second electrical loop including first switch means having open and closed conditions and positioned for operation by said first switch operating means in said first loop, second switch operating means in series with said first switch means in said second loop, a third electrical loop including heating means for heating said mass, second switch means in series with said heating means and having open and closed conditions and positioned for operation by said second switch operating means, said first switch operating means being responsive to variations in electrical current flowing through said variable resistance means for a cyclically operating said first switch means, and said second switch operating means being responsive to cyclical operation of said first switch means for cyclically operating said second switch means to control operation of said heating means.

2. The circuit of claim 1 wherein said first switch operating means comprises a first resistance heater and said first switch means includes a first bimetallic element positioned in heat transfer relationship with said first resistance heater.

3. The circuit of claim 2 wherein said second switch operating means comprises a second resistance heater and said second switch means includes a second bimetallic element positioned in heat transfer relationship with said second resistance heater.

4. The circuit of claim 3 and further including adjustable control means for adjusting the temperature at which said first switch means is cyclically operated by said first switch operating means.

5. The circuit of claim 1 wherein said second switch operating means comprises a second resistance heater and said second switch means includes a second bimetallic element positioned in heat transfer relationship with said second resistance heater.

6. The circuit of claim 1 and further including adjustable control means for adjusting the temperature at which said first switch means is cyclically operated by said first switch operating means.

7. A temperature control device for controlling operation of heating means for heating a predetermined mass to a desired temperature comprising; automatically variable resistance means having automatically variable resistance characteristics with varying temperature for passing electrical current therethrough at a value proportional to its temperature, said variable resistance means being positioned in heat exchange relationship with said mass, first switch operating means in series with said variable resistance means, first switch means having open and closed conditions and being positioned for selective operation between said open and closed conditions by said first switch operating means, second switch operating means in series with said first switch means for operation in response to opening and closing of said first switch means, second switch means having open and closed conditions and being positioned for selective operation between said open and closed conditions by said second switch operating means, said second switch means being connected in series with said heating means.

8. The device of claim 7 wherein said first switch operating means comprises an electro-magnetic coil and said first switch means comprises a magnetically-operated switch.

9. The device of claim 7 wherein said first switch operating means comprises a first resistance heater and said first switch means includes a first bimetallic element positioned in heat transfer relationship with said first resistance heater.

10. The device of claim 7 wherein said second switch operating means comprises a second resistance heater and said second switch means includes a second bimetallic element positioned in heat transfer relationship with said second resistance heater.

* * * * *